US008443472B2

(12) United States Patent
Sherman et al.

(10) Patent No.: US 8,443,472 B2

(45) Date of Patent: May 21, 2013

(54) LITTER ATTACHMENT BRACKET

(75) Inventors: Leslie H. Sherman, Denville, NJ (US); Paul Fredette, Vernon, NJ (US)

(73) Assignee: IMPACT Instrumentation, Inc., West Caldwell, NJ (US)

( * ) Notice: Subject to any disclaimer, the term of this patent is extended or adjusted under 35 U.S.C. 154(b) by 0 days.

(21) Appl. No.: 12/555,383

(22) Filed: Sep. 8, 2009

(65) Prior Publication Data

US 2010/0146702 A1 Jun. 17, 2010

Related U.S. Application Data

(60) Provisional application No. 61/095,021, filed on Sep. 8, 2008.

(51) Int. Cl.

*A47C 21/00* (2006.01)
*A61G 1/04* (2006.01)
*F16L 3/00* (2006.01)

(52) U.S. Cl.

USPC ................. 5/503.1; 5/658; 5/625; 248/125.8; 248/229.15; 248/311.2

(58) Field of Classification Search .................. 5/503.1, 5/658, 625, 626; 248/125.8, 176.1, 229.15, 248/311.2; 211/172

See application file for complete search history.

(56) References Cited

U.S. PATENT DOCUMENTS

| | | | | |
|---|---|---|---|---|
| 837,642 | A * | 12/1906 | Powell | 248/95 |
| 1,199,553 | A * | 9/1916 | Hogan | 248/207 |
| 1,865,757 | A * | 7/1932 | Honsowetz | 211/172 |
| 2,696,963 | A * | 12/1954 | Shepherd | 248/229.15 |
| 3,709,372 | A * | 1/1973 | Alexander | 211/74 |
| 3,709,556 | A * | 1/1973 | Allard et al. | 297/188.2 |
| 5,326,059 | A * | 7/1994 | Pryor et al. | 248/231.71 |
| 5,385,324 | A * | 1/1995 | Pryor et al. | 248/228.3 |
| 6,126,129 | A * | 10/2000 | Herron | 248/311.3 |
| 6,375,133 | B1 * | 4/2002 | Morrow | 248/125.8 |
| 6,431,505 | B2 * | 8/2002 | Chinn et al. | 248/121 |
| 6,481,679 | B1 * | 11/2002 | Bennett et al. | 248/224.51 |
| 6,619,599 | B2 * | 9/2003 | Elliott et al. | 248/125.8 |
| 6,971,617 | B2 * | 12/2005 | Nguyen | 248/286.1 |
| 2002/0104934 | A1 * | 8/2002 | Elliott et al. | 248/125.8 |
| 2010/0146702 | A1 * | 6/2010 | Sherman et al. | 5/503.1 |

* cited by examiner

Primary Examiner — Robert G Santos

(74) *Attorney, Agent, or Firm* — Gerald E. Hespos; Michael J. Porco; Matthew T. Hespos

(57) ABSTRACT

A modular bracket assembly is provided for use with a field hospital portable bed or a NATO litter. The assembly includes a clamp that can be releasably attached to the pole of a litter. The clamp is formed with a mounting aperture. The assembly also includes a lower support that can be mounted in the mounting aperture of the clamp or in attachment holes of field hospital portable beds or the socket that is formed within each hinge when a collapsible litter. An accessory mount is provided on the lower support and can receive a mounting flange affixed to a medical accessory. An upper support can be mounted on the top end of the lower support and can be used to support medical equipment items and/or IV solutions.

7 Claims, 5 Drawing Sheets

LITTER ATTACHMENT BRACKET

CROSS REFERENCE TO RELATED APPLICATION

This application claims priority on U.S. Provisional Patent Application No. 61/095,021 filed Sep. 8, 2008.

BACKGROUND OF THE INVENTION

1. Field of the Invention

This invention relates to an accessory bracket that may be attached to portable beds commonly used in military type field hospitals or litters, preferably litters that meet NATO standards, for the attachment of medical equipment commonly used in patient care and/or the transport of patients between locations via ground, air or seaborne conveyances.

2. Description of the Related Art

The standard bed used in military type field hospitals is portable and may be quickly set up for use or collapsed for stowage or transport. The standard military bed permits elevation of the patient's head and provides attachment points (holes) for a writing platform and an IV pole.

The prior art IV pole material is tubular and is formed from plural parts that can be telescoped relative to one another to vary the length of the IV pole. The fully extended prior art IV pole can have a length in excess of three feet. Significantly, the prior art IV poles were designed long before many currently essential portable equipment items became available. Thus, the prior art IV poles were never intended for mounting the portable equipment items that currently are used in military type field hospitals. Hence, the prior art IV poles do not have the requisite strength for supporting many portable equipment items that are used widely in military type field hospitals. The thin-wall tubular material of the prior art IV pole easily is subject to compression damage from attachment bracket clamps and is increasingly subject to shear or bending when equipment is mounted at positions higher up the pole. The field hospital portable bed has no provision for the safe attachment of medical equipment items.

The current standard of patient care has evolved considerably over the years. Military type field hospitals currently perform sophisticated and complex procedures comparable to procedures performed in civilian and fixed-facility hospitals. A significant limitation in providing this sophisticated level of care in a military field hospital involves the safe deployment of medical equipment in a manner that facilitates operator access and attachment to the patient.

Field hospitals typically have soft walls that are unable to mount medical equipment items. Accordingly, medical equipment and supplies currently are placed for use, peripherally, as close to the bed as possible. This existing disposition of medical equipment and supplies severely limits access and congests the immediate area by interposing wires, cables, connectors, hoses and tubing in the space between patient and equipment that desirably would be occupied by the care giver. The inherent risk in such an environment is entanglement of care givers, damage to equipment and inadvertent disconnections of patient-attached wires, cables, connectors, hoses and tubing.

Attempts have been made during the last twenty years to organize and clear the clutter in field hospitals with limited success. U.S. Pat. No. 6,842,922 discloses a Special Medical Emergency Evacuation Device (SMEED), which is designed to organize equipment and eliminate clutter principally during en route care of patients. The SMEED was designed to interface with a NATO litter and can be used only in a field hospital affixed to a mobile transporter. This option allows for the safe attachment of medical equipment items and obviates the need for the standard bed described above. However, the NATO litter has a stiff and uncomfortable patient-contacting surface. Furthermore, the NATO litter has a small surface area for the patient to lie upon and requires optional attachments to elevate the patient's head.

U.S. Pat. No. 5,626,151 discloses a device referred to as the LSTAT that also was designed principally for en route care. The LSTAT is a very heavy platform that contains a suite of medical products within a housing that occupies the dead-space beneath a NATO litter. The standard NATO litter attaches and locks into place atop the LSTAT so that the patient, the NATO litter, and the LSTAT may be carried or transported together as one integrated unit. However, the combination of the LSTAT, the NATO litter and the patient can weigh more than 350 lbs and requires six persons to carry. However, the LSTAT has been relegated to limited use in field hospitals due to its heavy weight and generally is not used for transport. The LSTAT suffers from many of the same deficiencies as the SMEED. More particularly, the LSTAT is attached to the standard NATO litter, which has a stiff uncomfortable patient-contacting surface material. Additionally, the NATO litter has a small surface area for the patient to lie upon, and requires optional attachments to elevate the patients head.

A relatively new device called Porta-Wall is being evaluated for possible use in field hospitals. Porta-Wall is designed to mount medical equipment, accessories and peripheral support elements (such as bins, lighting, electrical distribution, etc.) while maintaining a small "footprint" in the bed area.

With the possible exception of Porta-Wall, these few unsuccessful attempts for safely and effectively deploying medical equipment and supplies in field hospitals have remained almost entirely unchanged.

The NATO litter has a standard geometry and is characterized by an area of canvas supported between to two parallel poles. Modified versions of the NATO litter exist and may have: metal poles instead of wood poles, removable/replaceable handles instead of handles that are integral to the poles, nylon mesh instead of canvas, decontaminable mesh instead of nylon or canvas and litters that fold in half or in quarters for easy stowage, storage, or transport. The NATO litters typically are used to evacuate injured and/or wounded patients from the location of their injury or their most recent point of care to another care facility for treatment.

Many non-collapsible litters remain in use. However, improved versions of the NATO style litter have evolved mechanically and materially. The surface material of choice on the current generation of NATO litters is a decontaminable mesh. Additionally, the litter poles on many currently used NATO style litters have at least one hinge that permits the pole to be folded in half or quarters. When these litters are assembled and are ready-for-patient-use each hinge on each pole of the currently used NATO style litter has a round socket that can accommodate an accessory bracket. Litters that fold in half have two such sockets and litters that fold in quarters have six sockets. The diameters of the sockets in the current generation of NATO litters are intended to correspond dimensionally to the peripheral holes in field hospital portable beds and to be universally compatible with the above-described telescoping IV Poles.

Medical personnel desirably should monitor the patient's status to ensure timely delivery of proper medical treatment and/or to maintain the patient in a sufficiently stable condition to allow for safe transport. Unfortunately, the two poles and the canvas, nylon or decontaminable mesh patient support of a litter do not readily permit attachment of medical equipment items. Instead, equipment usually is placed atop the patient. However, equipment placed atop the patient imbalances the litter, is prone to fall off and generally requires a third or fourth person to help stabilize and carry the litter. Using the patient as the equipment carrying platform does not benefit patient care or safety and is not recommended under any circumstances.

Devices and techniques have been developed in recent years to transport injured/wounded patients. These devices include the above-described SMEED and LSTAT and the MIRF, which is described in U.S. Pat. No. 5,918,331. The LSTAT and MIRF are undesirable in that each carries a suite of equipment items even though all of these items are not necessary in every situation. Another drawback to the LSTAT and MIRF is that each has a fixed size and shape whether or not any of its equipment items are in use. The unused equipment items unnecessarily add weight and the same amount of space is taken up regardless of how many items are utilized. This weight disadvantage limits how far-forward to the point of injury the LSTAT and SMEED can go, and also drains assets by requiring the use of additional manpower to carry. Vertical space is at a premium in military evacuation platforms. Ground vehicles, fixed wing aircraft and helicopters employ rack or stanchion mounting systems to stack casualties. Thus, these vehicles can transport multiple patients, but, as a consequence, caregiver access to the patient and equipment is limited. The size and weight of an LSTAT or MIRF imposes limits on the number of patients that may be evacuated in any given type of transport vehicle. The SMEED device is much smaller and lighter than LSTAT and MIRF and can be custom configured to carry only the needed equipment items. The LSTAT and MIRF sit below the patient. The SMEED, on the other hand attaches atop the patient. This disposition of the SMEED creates access issues and the SMEED device cannot be height-adjusted or removed from the litter during transport if required by circumstances. SMEED is considerably lighter than LSTAT and MIRF. However, the top mounted equipment set of SMEED makes a "loaded" litter considerably more top heavy and requires a four-man team to carry safely.

Each of the above approaches has a unique usefulness. However, there is a need for a simple and lightweight means to affix equipment items directly to the litter. There also is a need to provide a means to affix equipment items to the litter without requiring the litter to be carried by more than two individuals.

SUMMARY OF THE INVENTION

The invention is a modular accessory bracket that easily attaches to a military field hospital portable bed or NATO style non-collapsible or collapsible litter. The modular accessory bracket can function as an IV pole. However, the primary purpose of the modular accessory bracket is to attach equipment items, a capability that was never designed into the field hospital portable bed/NATO litter IV Pole.

The modular accessory bracket includes an adjustable clamp that can be attached anywhere along the periphery of the field hospital portable bed or anywhere along the sides of the NATO litter. The adjustable clamp includes a mating receptacle with a captive locking mechanism.

The modular accessory bracket also has a lower support with a bar and a dovetail shaped receptacle. The bar has a bottom end with a diameter to fit in the receptacle of the adjustable clamp and a means for integrating with the locking mechanism of the adjustable clamp. The diameter of the bottom end of the bar also is dimensioned to fit in the attachment holes of the field hospital portable bed or the socket that is formed in each hinge of a collapsible litter. Thus, the lower support can be used with the adjustable clamp or independently of the adjustable clamp. An anti-turn mechanism preferably is provided for preventing the lower bar from rotating relative to the attachment holes of the field hospital portable bed or the socket that is formed in each hinge of a collapsible litter. A keyway is provided at the top of the lower bar.

A dovetail shaped receptacle of the lower support is attached to the bar and is configured to receive a dovetail shaped flange that is common to many medical equipment items used by the military. The bar of the lower support extends above the dovetail shaped receptacle a sufficient distance to accommodate attachment of multiple infusion pumps or other pole mounted portable equipment items.

The modular accessory bracket also includes an upper support that is configured to mate with the top end of the bar of the lower support. For example, the upper support may include a mating receptacle, a mating keyway and a captive locking mechanism that attaches to the top of the bar of the lower support. The top end of the upper support has means for simultaneously attaching multiple IV solution pouches or bottles. The lower and upper supports can be used together with the adjustable clamp or independently of the adjustable clamp.

The modular accessory bracket may be stowed in a kit pouch.

DETAILED DESCRIPTION OF THE PREFERRED EMBODIMENT

Figure 1:
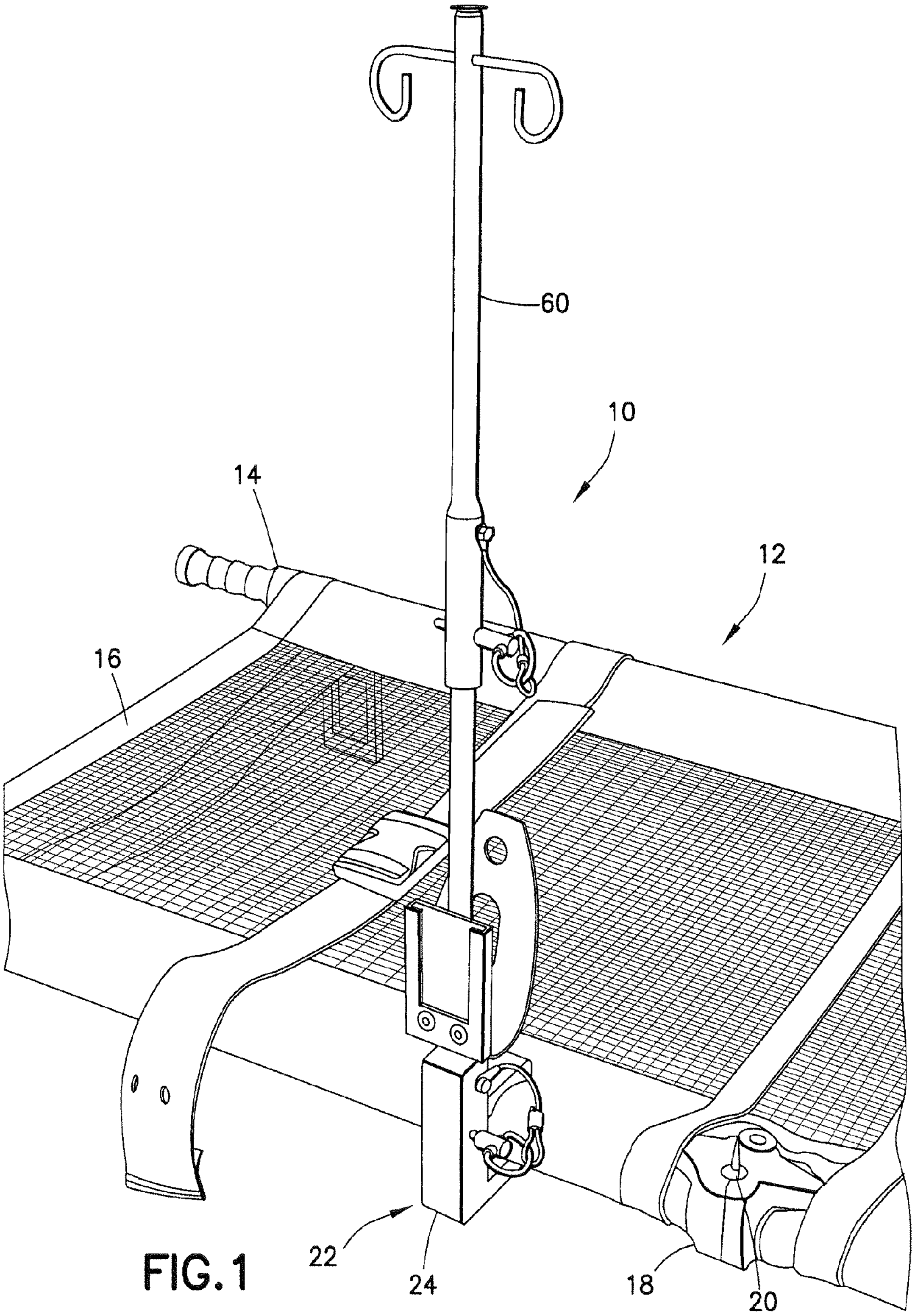
FIG. 1 is a perspective view of the modular accessory bracket mounted to a pole of a litter.
Figure 2:
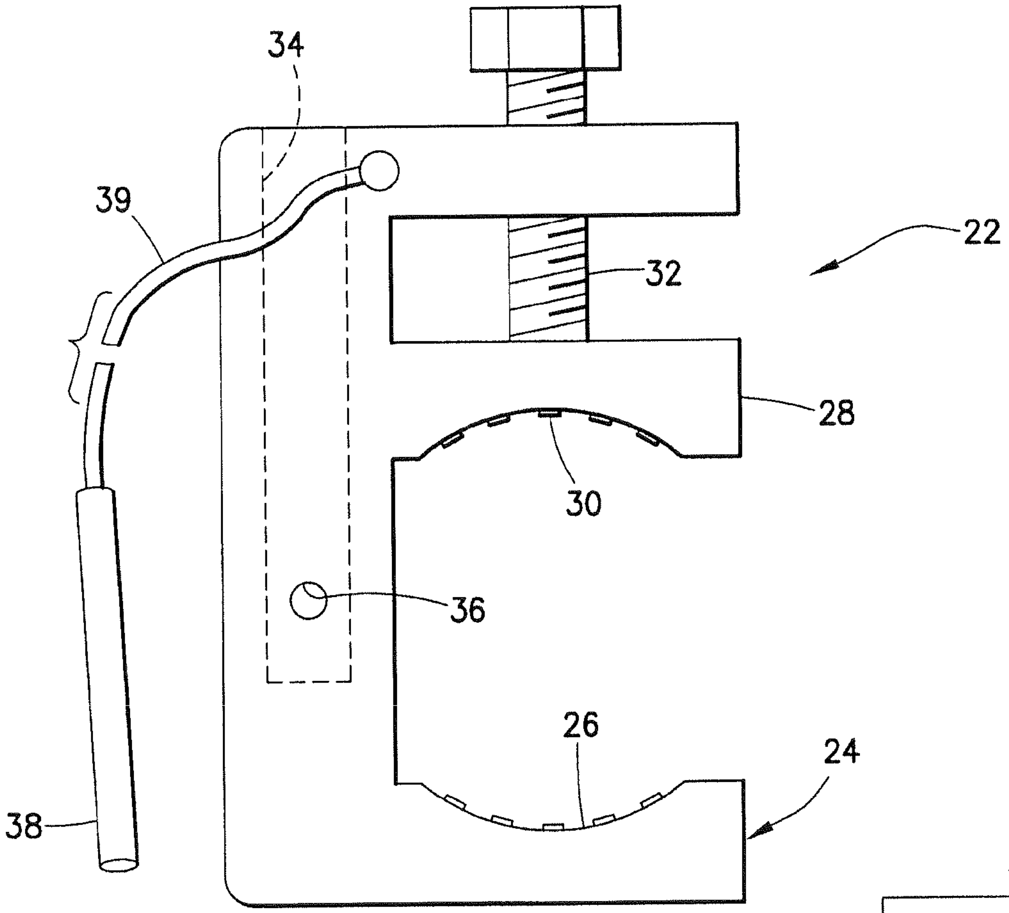
FIG. 2 is a side elevational view of the adjustable clamp of the modular accessory bracket of the subject invention.
Figure 3:
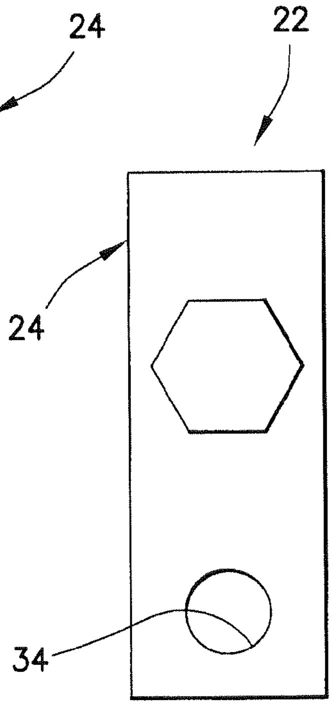
FIG. 3 is a top plan view of the adjustable clamp of FIG. 2.
Figure 4:
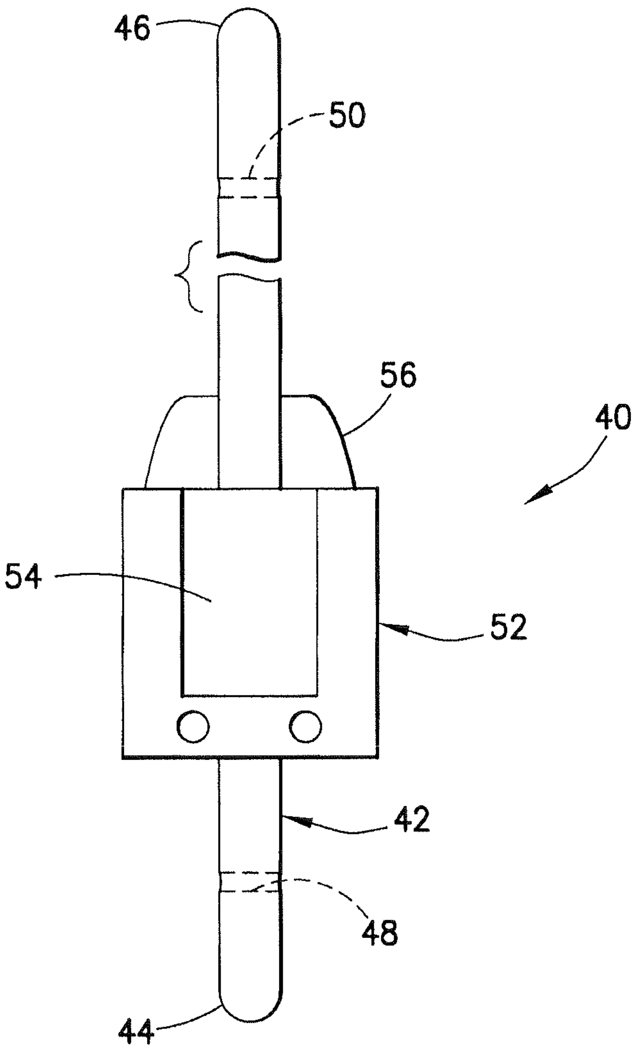
FIG. 4 is a front elevational view of the lower support assembly.
Figure 5:
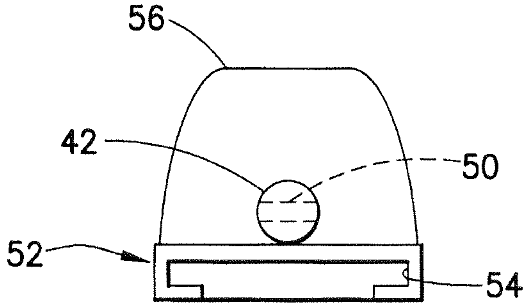
FIG. 5 is a top plan view of the lower support.
Figure 6:
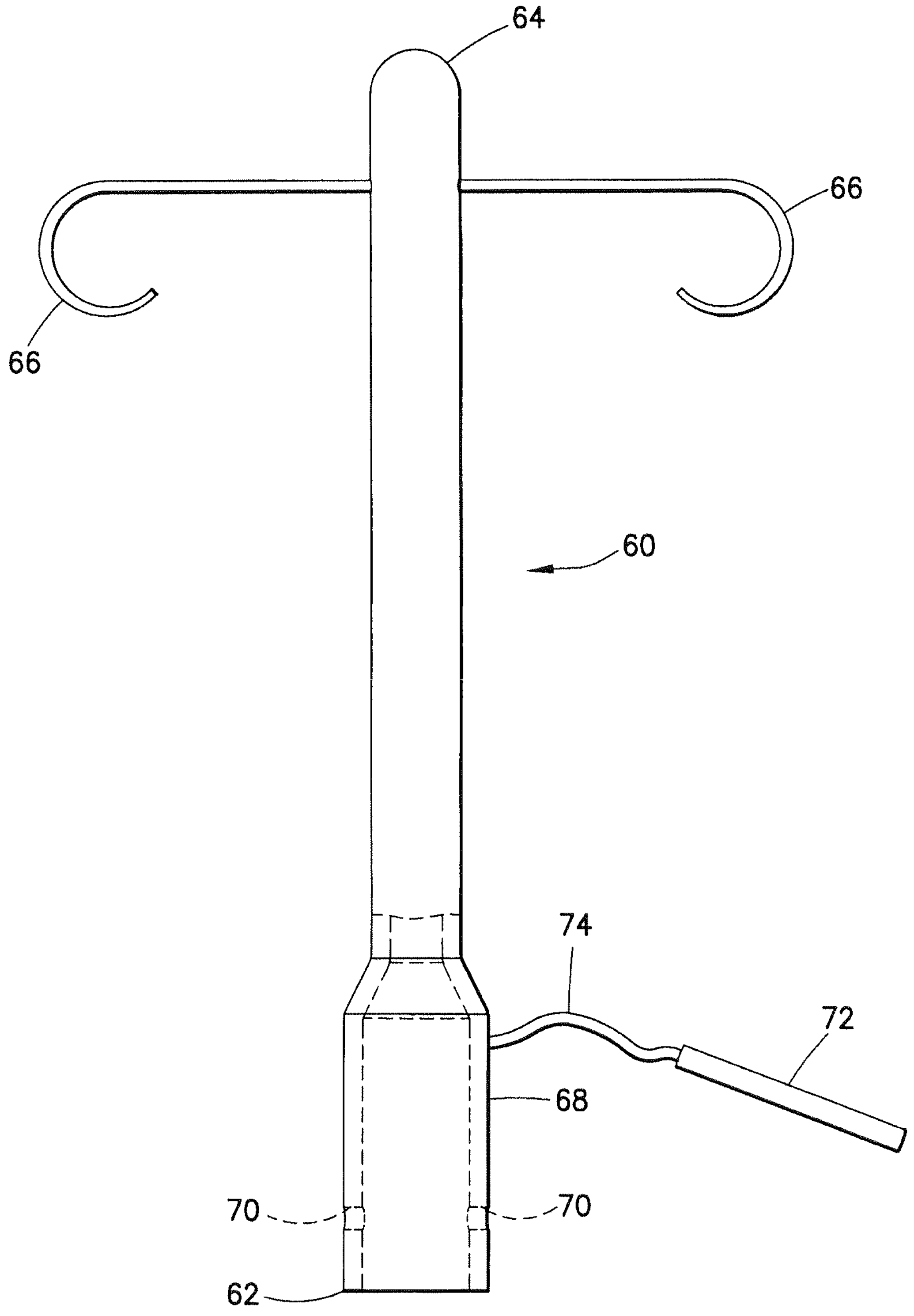
FIG. 6 is a front elevational view of the upper support.

A modular accessory bracket in accordance with the invention is identified generally by the numeral 10 in FIG. 1. The modular bracket assembly 10 can be used with a NATO-style litter 12 or with a field hospital portable bed (not shown). The litter 12 has two poles 14 and a patient support 16 extending between the two poles 14. The poles 14 may be formed from wood, but preferably are formed from a light weight metal, such as aluminum. Additionally, each pole 14 has at least one hinge 18 so that the poles 14 and the entire litter 12 can be collapsed when not in use. Each hinge 18 has a substantially cylindrical hole 20 extending entirely therethrough for receiving a portion of the modular bracket assembly 10, as explained herein. The holes 20 are oriented to align vertically when the patient support 16 is horizontal. Additionally, the holes 20 have diameters that correspond dimensionally to diameters of the standard attachment holes of the field hospital portable bed (not shown). The patient support 16 is formed from a flexible fabric, such as canvas, a nylon mesh or decontaminable mesh.

The modular bracket assembly 10 includes an adjustable clamp 22 with a C-shaped body 24 that has a concave gripping surface 26 defining a curvature substantially corresponding to the curvature of the poles 14. The concave gripping surface 26 has gnarling or ribs to facilitate gripping of the pole 14. The adjustable clamp 22 also has a jaw 28 that is movably disposed relative to the body 24. The jaw 28 has a concave gripping surface 30 that substantially corresponds to and opposes the concave gripping surface 26. A threaded actuator 32 threadedly cooperates with the body 24 and the jaw 28 for selectively moving the concave gripping surfaces 26 and 30 toward or away from one another in a known manner. Thus, the adjustable clamp 22 can be mounted securely to any location on either of the poles 14 by positioning the clamp 22 along the selected pole 14 and tightening the threaded actuator 32 when the clamp 22 is at the desired position. Additionally, the clamp 22 easily can be removed and repositioned easily by loosening the threaded actuator 32.

The body 24 of the clamp 22 includes an aperture 34 extending entirely therethrough in a direction substantially parallel to the threaded actuator 32. The aperture 34 has an inside diameter substantially equal to the diameter of the hole 20 of the hinge 18 of the litter 12. A clamp keyway 36 extends into the body 24 and intersects the aperture 34 at a substantially right angle. A pin 38 is tethered to the clamp body 24 by a wire 39. The pin 38 is dimensioned to be received in the clamp keyway 36.

The modular bracket assembly 10 further includes a lower support 40. The lower support 40 includes a solid metal bar 42 with opposite first and second ends 44 and 46. First and second bar keyways 48 and 50 extend through the bar 40 at locations spaced selected distances from the respective first and second ends 44 and 46. The bar keyways 48 and 50 have inside diameters substantially equal to the inside diameter of the clamp keyway 36. The bar has an outside diameter slightly smaller than the inside diameter of the aperture 34 in the clamp body 24, and hence slightly smaller than the inside diameter of the hole 20 of the hinge 18 or the inside diameters of the standard attachment holes of the field hospital portable bed (not shown). With this construction, the first end 44 of the bar 42 can be mounted in the aperture 34 in the clamp body 24. The pin 38 then can be passed through the clamp keyway 36 and into or through the first keyway 48 of the bar 42 to fix the bar 42 both axially and rotationally relative to the clamp body 24.

The lower support 40 further includes an accessory mount 52 secured to the bar 42 at a position slightly closer to the first end 44 than the second end 46 of the bar 42. The accessory mount 52 is formed with a dovetail shaped receptacle 54 that is configured to receive the dovetail shaped mounting flange that is common to many medical equipment items used by the military.

Figure 7:
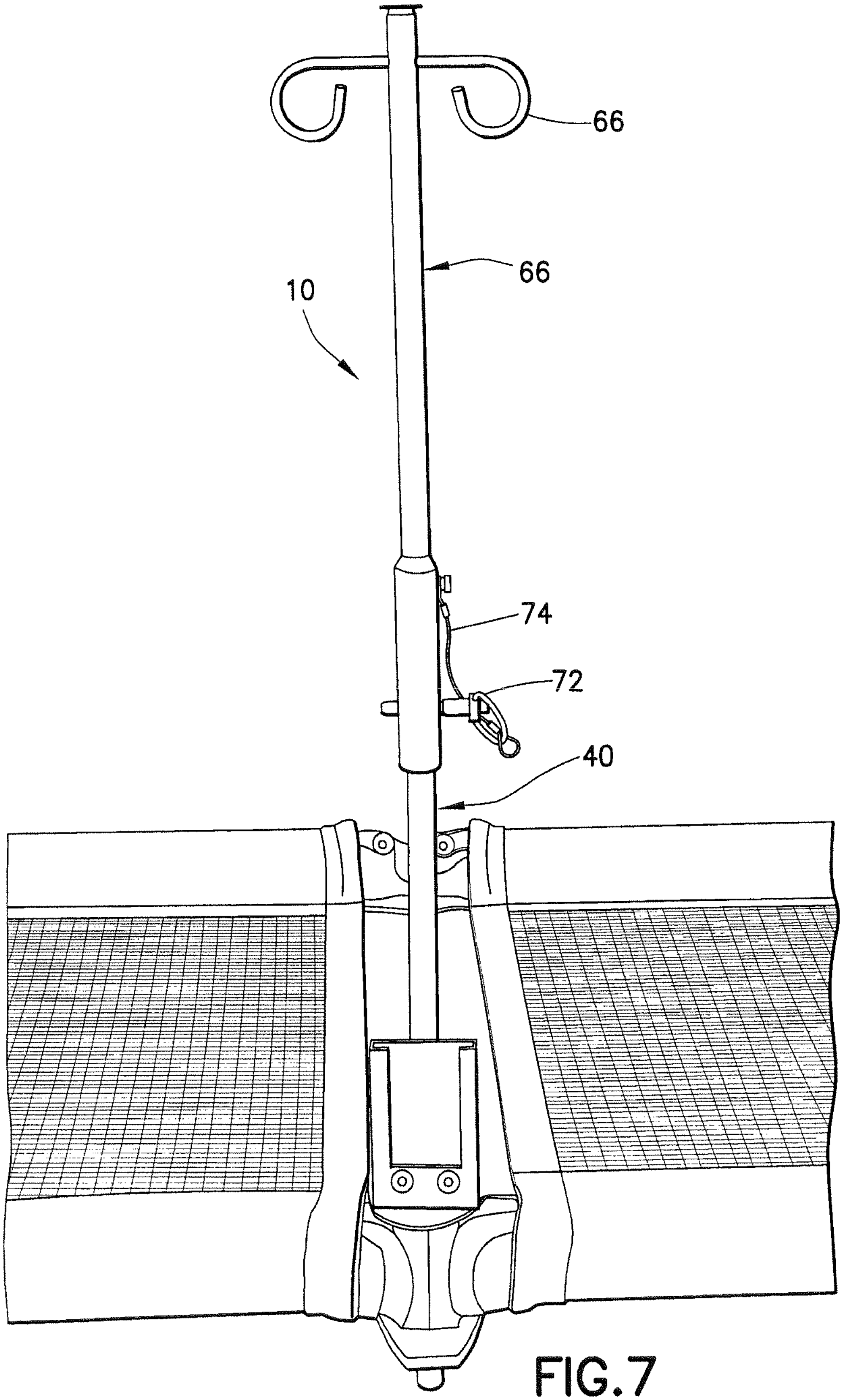
FIG. 7 is a front elevational view of the modular accessory bracket mounted to the hinge of a litter.

The lower support 40 further includes a rotation restriction member 56 that can be secured to the accessory mount 52 and the bar 42 in either of two optional orientations. The rotation restriction member 56 is dimensioned to pass through a space between the hinge 18 and the patient support 16, as shown in FIG. 7, when the first end 44 of the bar 42 is mounted in the hole 20 of the hinge 18. More particularly, the rotation restriction member 56 is positioned adjacent the hinge 18 to prevent the bar 42 from rotating in the hole 20 of the hinge 18. Alternatively, the rotation restriction member 56 can be directed upwardly when the first end 44 of the bar 42 is mounted in the aperture 34 in the clamp body 24, as shown in FIG. 1 to ensure that there is no interference between the rotation restriction member 56 and the patient support 16.

The modular bracket assembly 10 further includes a upper support 60. The upper support 60 has opposite upper and lower ends 62 and 64. The part of the upper support 60 adjacent the upper end 62 is a rigid rod and preferably is a solid metal rod. Hooks 66 are mounted through the upper support 60 near the upper end 62 and are configured to support multiple IV solution pouches or bottles. The part of the upper support 60 adjacent the lower end 64 is a rigid hollow metal tube 68 that is dimensioned to telescope over the second end 46 of the bar 42. An upper support keyway 70 is formed through the tube 68 at a position to align with the second keyway 50 of the bar 42 when the tube 68 is telescoped completely over the second end 46 of the bar 42. An upper support pin 72 is tethered to the upper support 60 by a wire 74 and is dimensioned to pass through the upper support keyway 70 and into the second the second keyway 50 of the bar 42 to prevent axial or rotational movement of the upper support 60 relative to the bar 42 of the lower support 40.

The modular bracket assembly 10 can be used with several optional configurations and at several optional positions. For example, the clamp 22 can be mounted at any optional position on a pole 14 of a litter 12 so that the aperture 34 is oriented substantially vertically. The first end 44 of the bar 42 then is inserted into the aperture 34 of the clamp 22 and is positioned so that the keyways 36 and 48 align. The pin 38 then is inserted through the aligned keyways 36 and 48 to fix the lower support 40 axially and rotationally relative to the clamp 22 and the litter 12. The tube 68 of the upper support 60 then can be telescoped over the second end 46 of the bar 42. The keyways 50 and 70 then are aligned and the pin 72 is passed through the aligned keyways 50 and 70 to fix the upper support 60 axially and rotationally to the lower support 40. The upper support 60 does not have to be used on all occasions. More particularly, the clamp 22 can be mounted to the litter 12 and the lower support 40 can be mounted to the clamp 22, as described above. The dovetail shaped mounting flange that is common to many medical equipment items used by the military then can be inserted into the dovetail shaped receptacle 54 of the accessory mount 52 that is part of the lower support 40. With this optional configuration, the appropriate medical equipment item can be mounted at the optimal location on the litter 12 that will permit efficient monitoring of both the equipment and the patient. Additionally, the medical equipment will be at a relatively low position to avoid the top heavy arrangement of the prior art and to provided an assembly that is easy to transport.

The modular bracket assembly 10 also can be used without the clamp 22. More particularly, the first end 44 of the bar 42 can be mounted directly in the hole 20 of the hinge 18 of the litter 12 or in the standard attachment holes of the field hospital portable bed. The rotation restriction member 56 can be positioned adjacent the hinge 18 or corresponding structure on the field hospital bed to prevent the lower support 40 from rotating. The upper support 60 then can be mounted to the second end 46 of the bar 42 as described above so that multiple IV solution pouches or bottles can be supported near the patient. Alternatively, the dovetail shaped mounting flange that is common to many medical equipment items used by the military can be inserted into the dovetail shaped receptacle 54 of the accessory mount 52 that is part of the lower support 40. Thus, the appropriate medical equipment item can be mounted at one of at least two hinge 18 locations on the litter 12 that will permit efficient monitoring of both the equipment and the patient. Additionally, the medical equipment will be at a relatively low position to avoid the top heavy arrangement of the prior art and to provided an assembly that is easy to transport.

The modular bracket assembly of the invention provides several advantages over the above-described prior art. In particular, the modular bracket assembly enables a care giver to attach medical equipment items and/or IV solutions anywhere around the periphery of a field hospital portable bed and anywhere along the sides of the NATO litter including the attachment holes of field hospital portable beds or the socket that is formed within each hinge when a collapsible litter is assembled. The modular bracket assembly enables the various parts to be assembled in a way that prevents separation or rotation. However, the modular accessory bracket parts optionally can be rotated into the most favorable viewing angle for caregivers. Furthermore the preferred construction can be assembled easily, even in total darkness for use in-the-field by special operations personnel. The upper and lower supports provide a strong and lightweight means by which to attach many types of medical equipment items and/or IV solutions to the new generation of NATO litters. The supports are not subject to compression damage from attachment bracket clamps and the solid construction or the rod and most of the upper support ensures that these components are not subject to shear or bending as equipment is attached at higher locations.

The invention has been described with respect to a preferred embodiment. However, it will be apparent to those skilled in the art that various changes can be made without departing from the scope of the invention as defined by the claims. For example, elements other than the illustrated keyways can be provided for fixing the elements axially and rotationally, such as threads or bayonet type connections. The rotation restriction member 56 also can take many other optional configurations. The clamp need not have a threaded tightening member, and can be tightened by levers or the like. The figures illustrate one modular bracket assembly mounted to a litter. However, plural modular bracket assemblies are likely to be used simultaneously, and the simultaneously used modular bracket assemblies can be configured differently from one another. For example, some may use the clamp, while others may be mounted to a hole in a hinge. Additionally, the modular bracket assembly can be used with other types of litters, including those with no hinges or with more hinges.

What is claimed is:

1. A modular bracket assembly for simultaneously mounting a plurality medical accessories to a bed or litter, the modular bracket assembly comprising:

a clamp having a body configured for clamped engagement to a substantially horizontal support of the bed or litter, the clamp having a mounting element aligned substantially normal to the horizontal support of the bed or litter when the clamp is engaged with the horizontal support;

a support having a lower end mounted to the mounting element of the clamp to extend substantially vertically up from the clamp when the clamp is engaged with the horizontal support of the bed or litter and an upper end opposite the lower end, the upper end of the support being configured for mounting a first of the plurality of medical accessories;

means for preventing rotation between the support and the clamp; and at least one accessory attachment at a position on the support substantially adjacent the clamp and on a side of the support laterally of the bed or litter when the clamp is engaged with the horizontal support of the bed or litter, the at least one accessory attachment includes an accessory mount formed with an upwardly open dovetail shaped receptacle for receiving a mounting flange of a second of the plurality of medical accessories and being configured for mounting the second medical accessory laterally of the bed or litter and at a position lower than the first medical accessory while the first of the medical accessories is mounted to the upper end of the support.

2. The modular bracket assembly of claim 1, wherein the means for preventing rotation between the support and the clamp comprises a clamp keyway in the clamp, a support keyway in the lower end of the support and a pin removably engaged in the clamp keyway and the support keyway.

3. The modular bracket assembly of claim 1, further comprising means for preventing rotation between the support and the litter or bed.

4. The modular bracket assembly of claim 1, further comprising an upper rod releasably engaged with the upper end of the support.

5. The modular bracket assembly of claim 4, further comprising means for preventing rotation between the rod and the support.

6. The modular bracket assembly of claim 5, wherein the means for preventing rotation between the rod and the support comprises keyways in the rod and the support and a pin removably engaged in the keyways.

7. The modular bracket assembly of claim 4, further comprising hooks projecting from the rod at a position above the support.

* * * * *